Dec. 12, 1950         J. H. WARBURG ET AL         2,533,648
                         CIRCULAR SAW MAKING
                        Filed March 5, 1949
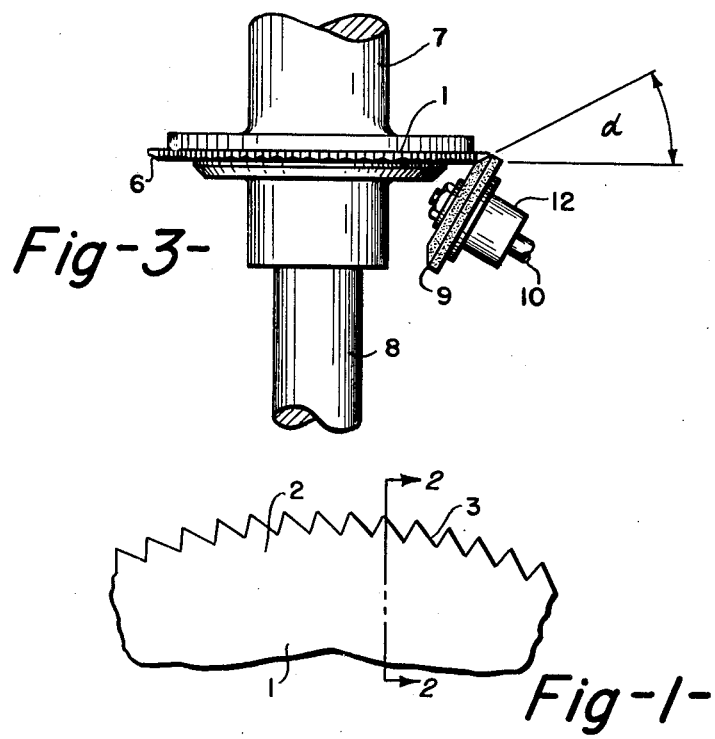
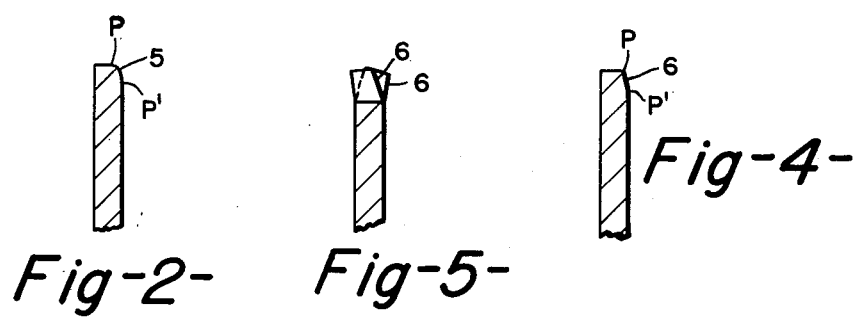
INVENTORS
JOSEPH H. WARBURG
RALPH M. WARBURG
BY
ATTORNEY Patented Dec. 12, 1950

2,533,648

UNITED STATES PATENT OFFICE 2,533,648

CIRCULAR SAW MAKING

Joseph H. Warburg and Ralph M. Warburg, New York, N. Y.

Application March 5, 1949, Serial No. 79,746

2 Claims. (Cl. 76—112)

This invention relates to improvements in circular saws and in a novel method of manufacturing the same; it relates particularly to saws of the above recited type which are produced in stamping devices or presses.

The satisfactory work of a circular cutting saw is based on the provision of sharp straight cutting edges on both opposite sides of the saw teeth. If these saws are manufactured by stamping or pressing methods a sharp cutting edge is produced on one side of the teeth only; on the opposite side a rounding of the tooth edge is created.

Various methods and means have been devised to remove these roundings and to provide the saws on both sides with sharp straight cutting edges. In conformity with one of the most common methods the circular saws are ground-off over their entire surface. The drawbacks of this procedure are extremely grave. The grinding of the circular steel blade on its entire face creates in the steel local strains and stresses of varying intensity; extensive and expensive hand operations called "hammering" are required to relieve these local strains and stresses and to flatten warps produced in the saw by the grinding. Often the most experienced hammerer cannot flatten these warped saws which accordingly are rejected. Saws which are not properly flattened cause not only friction but also dangerous vibrations at the high speed at which they are being used. The generally known dangerous "explosions" of circular saws which tear the same into fragments are the frequent consequence of this face grinding procedure. Moreover, the grinding of the saw over its entire face reduces its thickness and weakens the saw considerably.

It is a further object of the invention to preserve during the removal of the edge roundings the original size and particularly the thickness of the saw blade.

It is another object of this invention to eliminate all the drawbacks which arise from the hitherto customary removal of the edge roundings by the grinding of the saw throughout its entire surface.

With these and additional objects in view which will become apparent as this description proceeds this invention comprises in its broad aspect the removal of the roundings at the tooth edges of circular steel saws by grinding the same at an inclined angle the inclination of the grinding angle being controlled by the length of the roundings; the term "grinding," used in this description includes similar edge straightening and sharpening methods, such as, swaging, sanding and the like; care must be taken that the grinding work is restricted to the removal of the rounding only and that removal of the steel which exceeds this limit should be avoided.

The inclined cutting-away of the opposite straight edges of metal cutting band or hack saws is known; this method serves the purpose to remove those portions of the saw teeth which are decarbonized during the annealing treatment to which these types of saws are subjected; this known method, therefore, has no bearing on the removal of roundings produced at the one side of the teeth of circular wood cutting saws which roundings were produced during their manufacture by die- or any other stamping method.

If the removal of the roundings is effected after the setting of the saw teeth every second rounding only has to be ground, swaged or sanded, which greatly improves the manufacturing economy.

The invention will now be described more in detail, by reference to the accompanying drawings which illustrate a preferred embodiment thereof. In the drawings Fig. 1 is a side view showing a portion of a cutting circular saw to be processed in conformity with this invention, Fig. 2 is a vertical sectional view on line 2—2 of Fig. 1, Fig. 3 is a schematic side view of a device for use in the removal of the one-sided tooth roundings, Fig. 4 is a vertical sectional view of a tooth similar to Fig. 2 after removal of the edge rounding, and Fig. 5 is a vertical sectional view, similar to Figs. 2 and 4, after the saw teeth have been set.

In the drawings Fig. 1 shows a portion of a circular saw blade 1 provided at its edge with peripheral cutting sections 2 formed by the teeth 3.

Fig. 2 illustrates the rounding 5 of the tooth edge which is the natural result of the saw manufacture by die- or any other stamping method.

In conformity with the invention the rounding 5 is removed by grinding, sanding or swaging at an inclined angle whereby the inclined straight sharp edge 6 shown in Fig. 4 results.

Figure 3 shows schematically a device for grinding the rounding 5.

This device includes a saw carrier 7 supported on a vertical rotatable shaft 8. The grinder disc 9 is carried by a support 12 which is supported on an inclined shaft 10. The cutting edge of the grinding disc 9 is so adjusted that it removes the rounding 5 over its entire extent from point P to point P', see Fig. 2, but does not cut more than is predicated by the shape of the rounding 5. By the action of grinder 9 the straight cutting edge 6 is produced, which is inclined under angle in conformity with the inclined position of the grinder disc 9.

After the roundings 5 are removed in the above described manner and straight cutting edges 6 have been established the teeth are set in the customary manner whereby precaution must be taken to bend the teeth on the ground-off side to an extent which equals the setting distance plus the ground-off thickness at the points of the teeth.

If the removal of the roundings 5 is effected after the setting of the saw teeth has been effected every second tooth only needs to be treated in conformity with this invention.

What we claim is:

1. In a method of producing a saw blade the steps of stamping the blade from a metal blank to produce on the one face of the stamping teeth having a straight edge and on the opposite face of the stamping teeth having a rounded edge, removing the metal forming the rounded portion of the edge to produce a straight edge which is inclined relative to the saw blade and which conforms substantially to the depth of the teeth.

2. In a method of producing a saw blade the steps of stamping the blade from a metal blank to produce on the one face of the stamping teeth having a straight edge and on the opposite face of the stamping teeth having a rounded edge, removing the metal forming the rounded portion of the edge to produce a straight edge which is inclined relative to the saw blade and which conforms substantially to the depth of the teeth and setting the straightened tooth edges for a distance which equals the setting distance of the straight teeth plus the ground-off teeth width.

JOSEPH H. WARBURG.
RALPH M. WARBURG.

REFERENCES CITED

The following references are of record in the file of this patent:

UNITED STATES PATENTS

| Number | Name | Date |
|---|---|---|
| 1,603,755 | Ericson | Oct. 19, 1926 |
| 1,918,770 | McLean | July 18, 1933 |

FOREIGN PATENTS

| Number | Country | Date |
|---|---|---|
| 155,463 | Germany | Nov. 4, 1903 |
| 427,582 | Great Britain | Apr. 26, 1935 |